United States Patent [19]
Capelle

[11] Patent Number: 5,147,198
[45] Date of Patent: Sep. 15, 1992

[54] HIGH PERFORMANCE EXTRUDER WITH A CONSTANT NUMBER OF THREADS IN THE INLET AND OUTLET REGIONS OF A TRANSFER SHEARING SECTION

[75] Inventor: Gerd Capelle, Langenhagen, Fed. Rep. of Germany

[73] Assignee: Hermann Berstorff Maschinenbau GmbH, Hanover, Fed. Rep. of Germany

[21] Appl. No.: 693,237

[22] Filed: Apr. 29, 1991

[30] Foreign Application Priority Data

Dec. 14, 1990 [JP] Japan ................... 2-4039942

[51] Int. Cl.⁵ ................... B01F 7/00; B29C 47/00
[52] U.S. Cl. ................... 425/205; 366/80; 366/88; 366/89; 366/90; 425/208; 425/376.1; 425/382.4
[58] Field of Search ................... 366/80, 88, 89, 90; 425/135, 145, 146, 169, 170, 203, 205, 207, 208, 209, 376.1, 382.4

[56] References Cited

U.S. PATENT DOCUMENTS

| | | | |
|---|---|---|---|
| 3,613,160 | 10/1971 | Loemans et al. | |
| 3,672,641 | 6/1972 | Slaby | 366/90 |
| 4,136,969 | 1/1979 | Meyer | 366/90 |
| 4,184,772 | 1/1980 | Meyer | 366/89 |
| 4,199,263 | 4/1980 | Menges et al. | 366/307 |
| 4,462,691 | 7/1984 | Boguslawski | 366/90 |
| 4,462,692 | 7/1984 | Meyer | 366/89 |
| 4,723,901 | 2/1988 | Sarumaru | 425/208 |
| 4,957,372 | 9/1990 | Meyer | 366/90 |
| 4,963,033 | 10/1990 | Huber et al. | 366/90 |
| 4,994,223 | 2/1991 | Hestehave et al. | 425/209 |

FOREIGN PATENT DOCUMENTS

| | | | |
|---|---|---|---|
| 1142840 | 1/1963 | Fed. Rep. of Germany | 366/89 |
| 2235784 | 7/1972 | Fed. Rep. of Germany | |
| 3003615 | 2/1980 | Fed. Rep. of Germany | |

Primary Examiner—Jay H. Woo
Assistant Examiner—Scott Bushey
Attorney, Agent, or Firm—Foley & Lardner

[57] ABSTRACT

A pin transfer extruder is provided, wherein the pin-barrel and transfer mixing sections, which are known per se and have only been used individually hitherto, are jointly used in one extruder. Throttle pins, which are disposed in the transfer mixing section in the region of the greatest housing thread volume, permit universal use of the extruder in respect of the extruded material. The combination of both mixing systems permits the throughput of material to be increased in a surprising manner by 60% to 100%, while a constant mixing quality is maintained and the driving torque is halved. The number of the housing and screw flights remains independent of the cross-sectional area of the housing and screw threads because the number of housing and screw threads is constant.

10 Claims, 5 Drawing Sheets

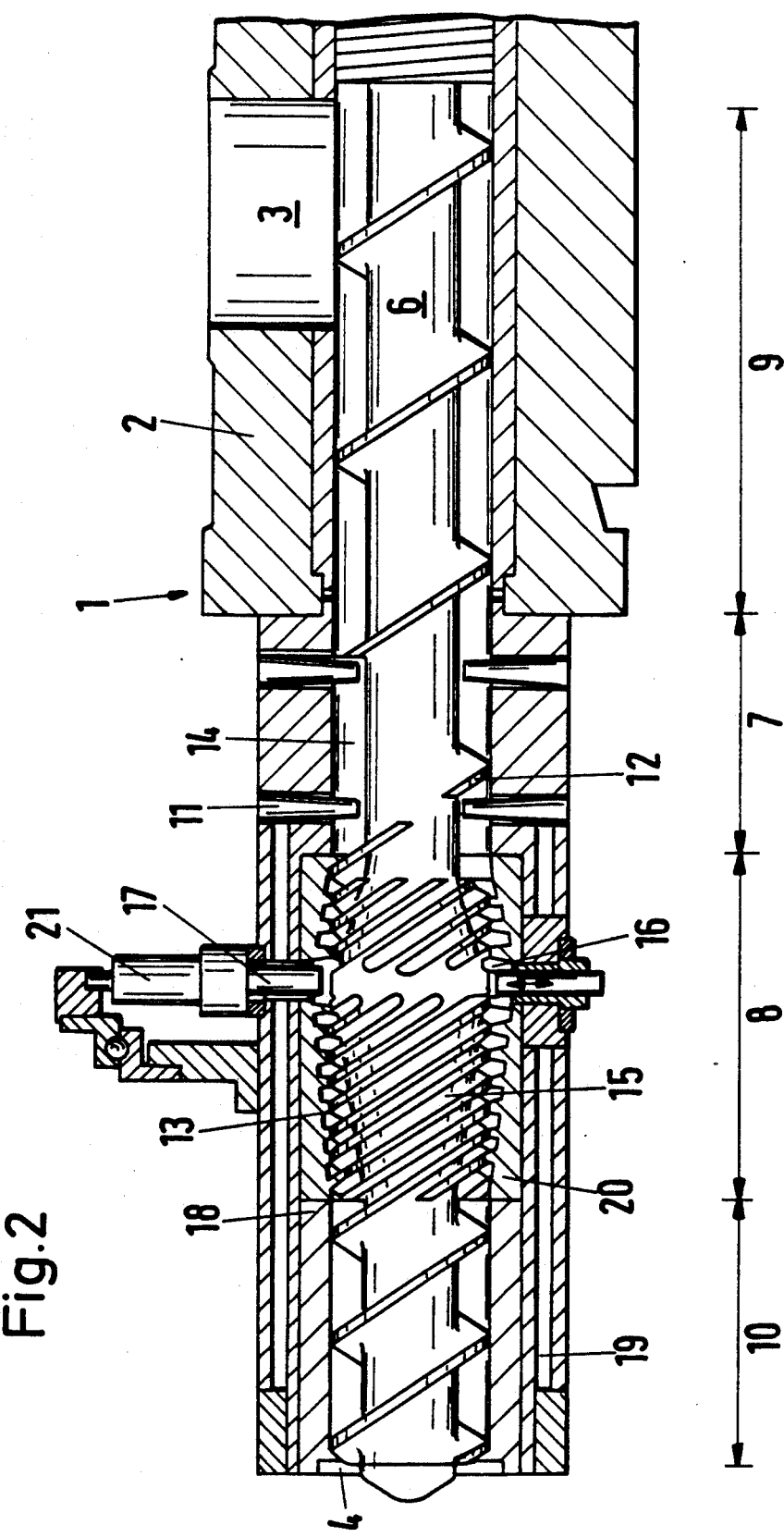

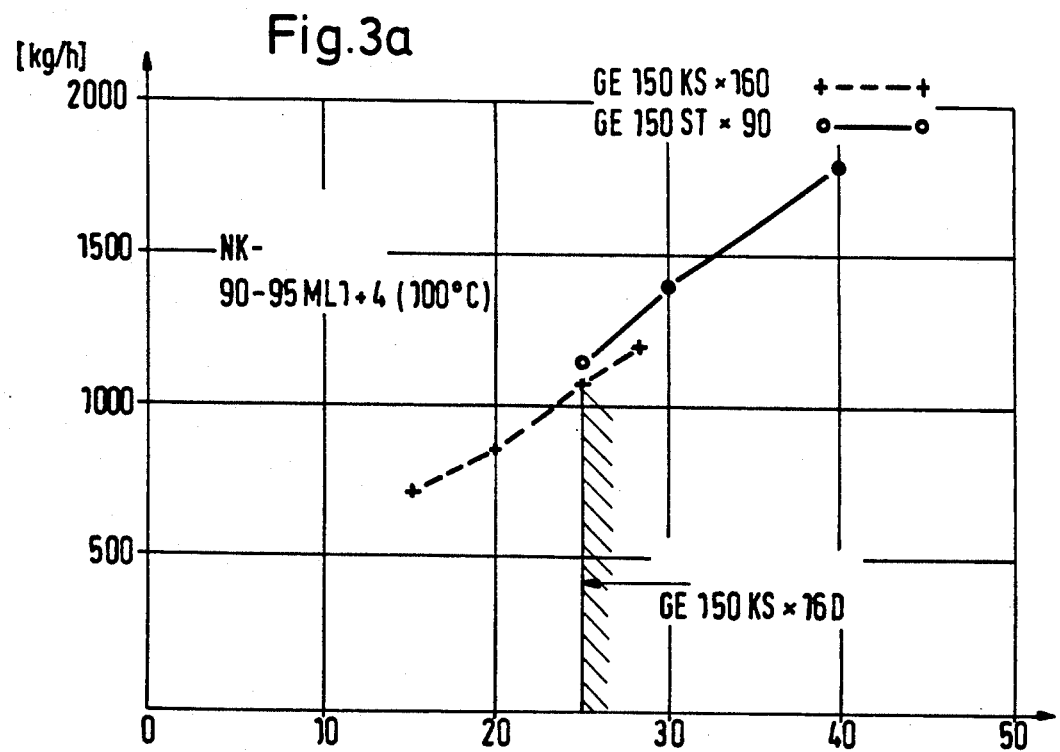
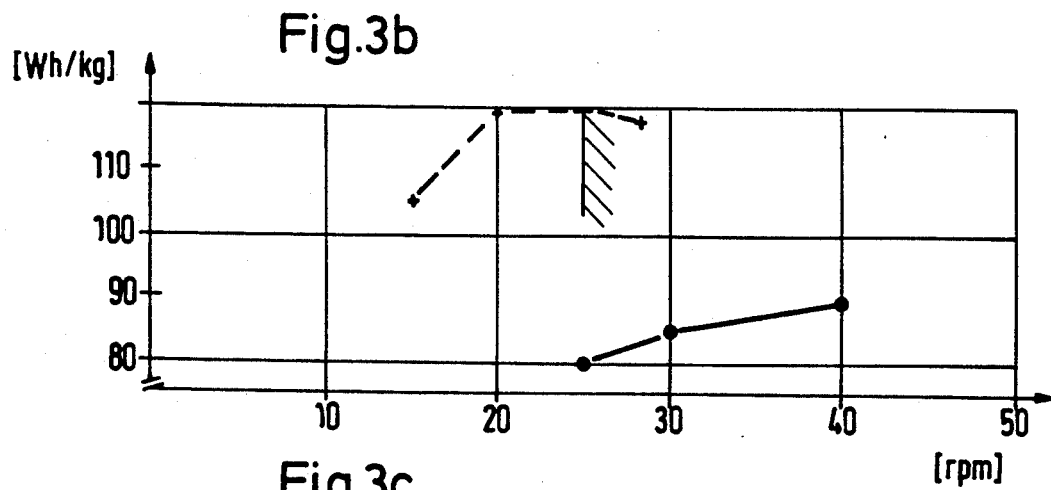
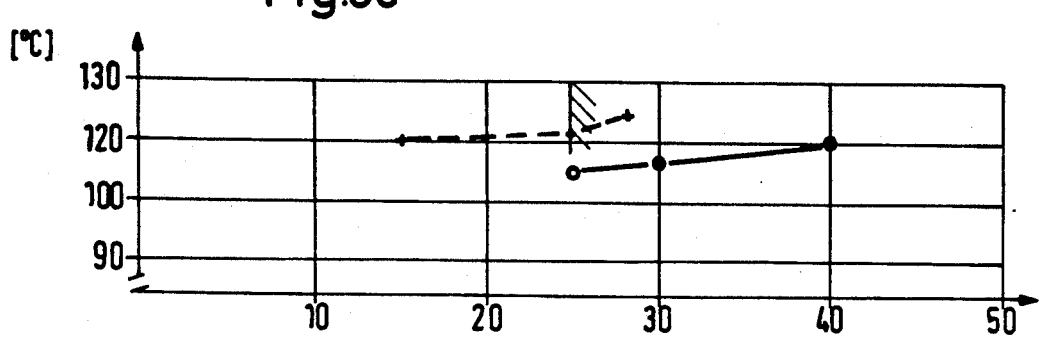

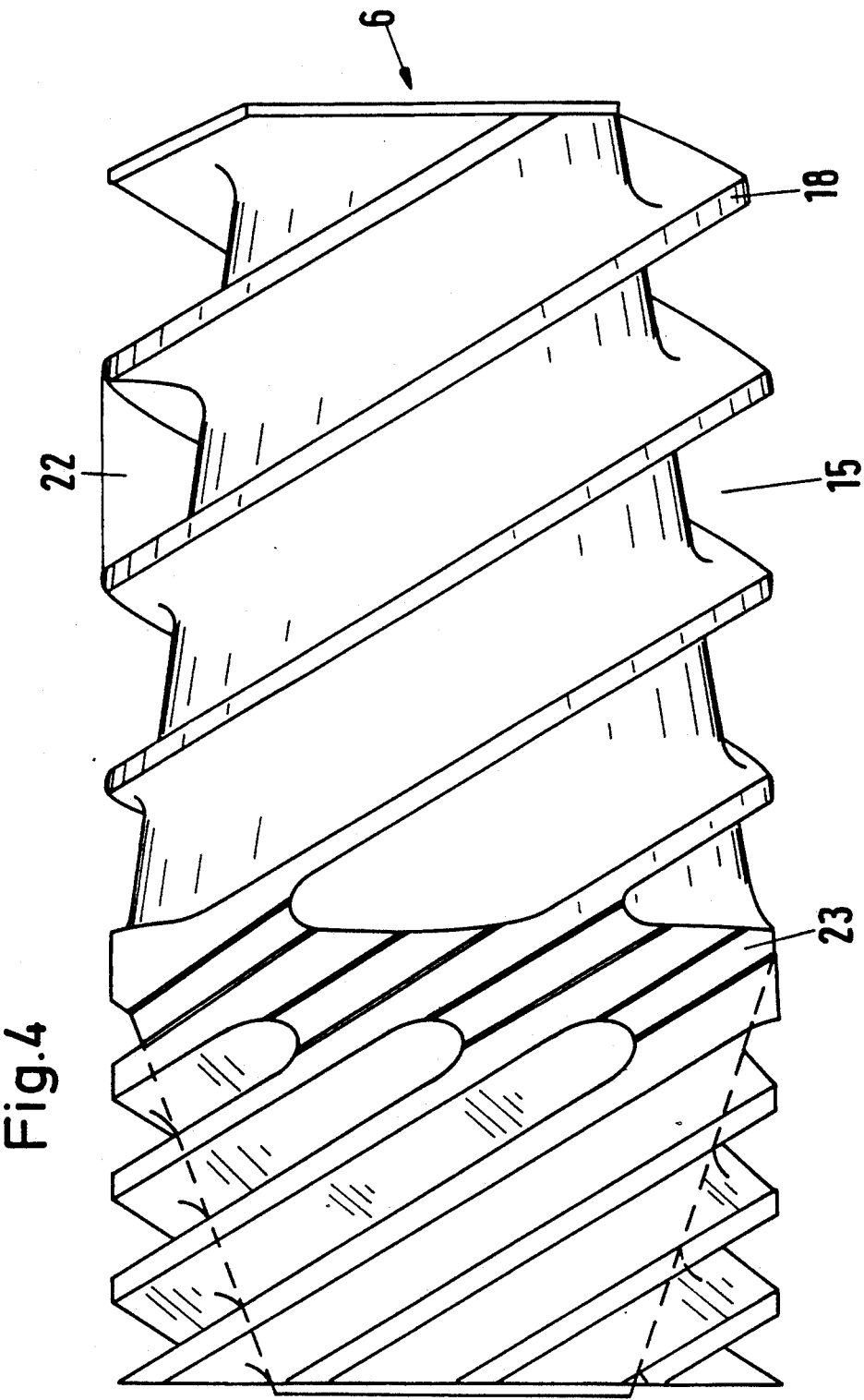

HIGH PERFORMANCE EXTRUDER WITH A CONSTANT NUMBER OF THREADS IN THE INLET AND OUTLET REGIONS OF A TRANSFER SHEARING SECTION

FIELD OF THE INVENTION

The invention relates to an extruder for processing and producing rubber and thermoplastic plastics materials.

BACKGROUND OF THE INVENTION AND PRIOR ART

In the past, so-called pin-barrel extruders were always used as discharge and homogenizing extruders, such as are known, for example, from German Offenlegungsschrift No. 2 235 784 or German Offenlegungsschrift No. 3 003 615 belonging to the assignee of the present invention. In extruders of this type of construction, metal pins protrude radially through the extruder housing into the processing chamber of the extruder, the extruder screw having interrupted screw flights in this region.

These extruders are distinguished by their very high discharge rate and good homogenizing effect upon the material to be processed and permit also an increased throughput of material per unit of time, compared with conventional cold-feed extruders having a screw with a shearing section, with the r.p.m. of the screw remaining constant.

These advantages have resulted in pin-barrel extruders becoming the most commonly used extruders in the rubber industry in the last 15 years.

Independently of this, a mixing section for an extruder has been developed, which has become known as a transfer mixing section (DE-A 11 42 839). This mixing section is substantially characterised in that both the extruder screw and the internal wall of the extruder housing are provided with grooves and flights over a predetermined length, the thread depth of the extruder screw, when viewed in the longitudinal direction of the extruder housing, decreasing to zero and subsequently increasing again at the same rate as the thread depth of the grooves in the housing respectively increases and decreases again. As a result of this configuration for the extruder screw and housing, the extruded material can be exchanged fully between the screw grooves and the housing grooves, thereby producing a good mixing effect.

Compared with the pin-barrel extruder, the transfer extruder could claim for itself a certain corner of the market, especially when the overall length of the extruder had to be kept small.

It is additionally known from U.S. Pat. No. 3,613,160 to provide extruders with throttle components, whereby the conveyance of extruded material in the extruder may be variably controlled externally. For this purpose, according to this publication, a substantially cylindrical component is disposed on the screw shaft of the extruder screw, said component rotating jointly with the screw and completely blocking the processing chamber downstream. In the region of this cylindrical component, two throttle pins each extend, externally, through the extruder housing radially into an axially oriented overflow conduit, which is incorporated into the internal wall of the extruder housing.

When the throttle pins are retracted, a portion of the extruded material situated upstream of the cylindrical component may pass through these conduits to the downstream section of the extruder. This flow of extruded material can be controlled by the insertion of the throttle pins into these overflow conduits to different depths.

Finally, a transfer extruder is known from German Patent Specification No. 27 31 438, wherein the number of flights in the housing and on the screw in the transfer section decreases as the cross-sectional area of the screw threads increases and increases as the cross-sectional area of the screw threads decreases. In such case, screw threads having a larger cross-sectional area have a greater width than screw threads having a smaller cross-sectional area.

The tests which were carried out in the past on such mixing sections have indeed shown that comparatively good mixing qualities are achievable therewith, and that the mixing section is completely self-cleaning. However, it was disadvantageous that the type of construction proposed resulted in a relatively large manufacturing outlay and, in consequence, the production costs were high.

SUMMARY OF THE INVENTION

Since the technology for these mixing extruders has not changed in the last 15 years, apart from detail improvements, the basic object of the invention was to provide a mixing and homogenising extruder which, compared with known apparatus, permits an increased discharge output with reduced investment costs, yet with at least an equally good mixing effect, and allows a considerably shorter overall length together with an expansion of the hitherto fields of application of mixing and homogenizing extruders.

Finally, the plasticizing work which is achievable by this extruder should be freely adjustable depending on the properties of the extruded material.

As a result of combining the two known types of construction for the mixing sections, it was possible to create an extruder having the features of the main claim and having considerable advantages over the mixing and homogenizing extruders of the prior art.

Thus, by utilizing an extruder which has a pin-barrel section and a transfer section with additional pins, it has been possible to ascertain that, while retaining the same mixing quality and the same screw r.p.m., the driving forces of the extruder could be reduced by up to 50%, and the throughput of material could be increased by up to 60% to 100%.

These excellent results also produce a 50% reduction in the driving torque, thereby resulting in a considerable reduction in the drive costs when manufacturing the extruder. In addition, as a result of combining the pin-containing barrels and the transfer section technology, the overall length of the mixing section required for the same mixing quality can be reduced by approximately 50% compared with an extruder which operates only according to the pin-barrel principle.

Because of the provision of radially adjustable throttle pins, which protrude radially into the portion of the transfer section of the extruder housing where the housing threads substantially have their greatest thread volume, the proposed extruder can be adjusted for processing various rubber mixtures. In consequence, with the depth of penetration of the throttle pins into the housing threads and into the processing chamber of the extruder, it is possible for the plasticizing work, or respectively the friction energy which is converted in the transfer section, to be pre-selected for the extruded material as desired and with regard to the mixture. In consequence, compared with hitherto known extruders of such type, reference may be made to a further, freely selectable process parameter in addition to the screw r.p.m. and the temperature of the processing section.

Finally, the configuration of the extruder screw and of the housing sleeve in the transfer section, with regard to the lack of dependence of the number of threads and, in consequence, the number of flights upon the cross-sectional area of the threads, permits economical manufacture while maintaining the self-cleaning facility and the mixing quality of the extruder.

BRIEF DESCRIPTION OF THE APPLICATION DRAWINGS

The invention can be explained with reference to the described embodiments and the accompanying drawings, in which FIG. 1 is a longitudinal sectional view through a single-screw extruder without any throttle pins in the transfer section;

FIG. 2 is a longitudinal sectional view through a single-screw extruder having throttle pins in the transfer section;

FIGS. 3 a-c are graphs showing the results of tests using an extruder of the proposed type of construction compared with the conventional pincontaining extruder;

FIG. 4 is a fragmentary enlarged side elevational view of a transfer screw section;

DETAILED DESCRIPTION OF THE PREFERRED EMBODIMENTS

Figure 1:
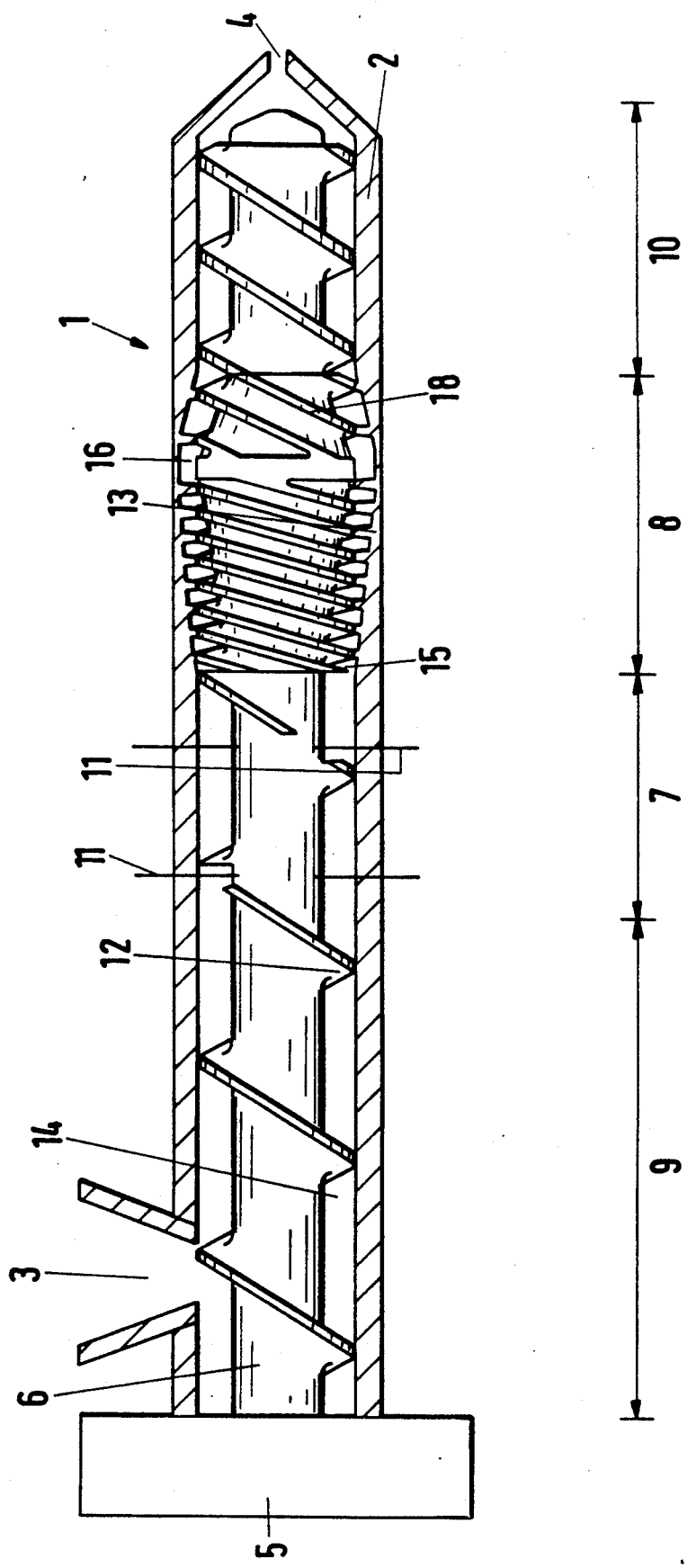

FIG. 1 is a schematic longitudinal sectional view through a single-screw extruder 1. One extruder screw 6 is disposed internally of the extruder housing 2 and is drivable about its longitudinal axis by a drive unit 5. In the region of its upstream end, the housing 2 has an inlet opening 3 for receiving the material which is to be extruded, with the material leaving and leaves the extruder, ready mixed and homogenised, through the outlet opening 4.

In the feed section 9, the extruder screw 6 has a screw geometry which is suitable for drawing into the extruder, in a manner known per se, the material which has been supplied through the inlet opening 3 and for plasticizing such material.

A pin-barrel section 7 is provided downstream of this feed section, and in said pin-barrel section two rows of pins 11 shown schematically in FIG. 4, protrude radially through the extruder housing 2 towards the screw axis and into the processing chamber 14 of the extruder. The screw flights 12 are interrupted in known manner in the pin plane in this section 7, in order to avoid colliding with the pins 11.

Downstream of the pin-barrel section 7, there is disposed a transfer section 8, wherein, in this embodiment, the angles between the flights 18 of the extruder screw 6 and the flights 13 of the extruder housing 2 are greater than or equal to 105° and do not form any angles with one another which are complementary to 90°.

The transfer section 8 may be divided into an inlet region and an outlet region, both regions being separated from each other by the housing thread having the greatest thread depth, shown in the region of reference numeral 16 in FIG. 1.

In this transfer section 8 of the extruder, the number of threads in the inlet and outlet regions is constant, whereby the number of flights in the inlet and outlet regions depends on the cross-section of the housing or screw threads 16,15.

The final processing section of the extruder screw 6 is formed by the pressure increasing section 10, in which the screw geometry is so selected that the pressure of the molten mass can be increased to the required tool pressure in known manner.

In addition to this embodiment, other possible embodiments are also conceivable for this pin transfer extruder. Thus, for example, the transfer section 8 could also be disposed upstream of the pin-barrel section 7, although the above-mentioned variant produces better mixing and homogenizing results. In addition, it may be mentioned here that the pin-barrel section also fulfils its mixing and homogenizing task with more than two rows of pins. In view of the ratio between costs and mixing quality, it is best to provide the pin-barrel section with one to five rows of pins.

The preferred length of the individual extruder sections, with an extruder length of 10 screw diameters (D), is substantially 3 D for the feed section, 1.5 to 10 D, preferably 1.5 to 2 D, for the pin-barrel section, 2 to 2.5 D for the transfer section, and approximately 3 D for the pressure augmenting section.

Independently of these particulars, however, additional processing sections may also be disposed upstream of, downstream of or between the pin-barrel and transfer sections, such as, for example, degassing or kneading sections.

FIG. 2 shows a pin transfer extruder 1 with throttle pins 11 in the transfer section. The feed section 9 of this extruder also corresponds here to the conventional cold-feed extruder and has a ratio of screw length (D) to screw diameter of three.

The feed section 9 has disposed downstream thereof an extruder portion with a total length of 6 D, in which there is situated the pin-barrel section 7 with two pin planes with extruder pins 11 disposed one behind the other. Downstream of the pin-barrel section 7, the transfer section 8 is provided with a length of substantially 2 D, and the pressure augmenting section 10 has a length of substantially 1.5 D.

The temperature of the extruder barrel 2 is controlled in known manner by temperature control bores 19 in the housing wall 2. In this embodiment the housing sleeve 20, and thus the transfer section of the extruder housing, is locked in the housing 2.

The pitch of the threads of the extruder screw and transfer section sleeve are so selected that the flights between the screw and the sleeve form an angle equal to or more than 105°. This advantageously results in the extruded material being subjected to an intensive shearing process as it passes through this transfer section, caused by the resultant large number of intersections between screw and sleeve flights per screw revolution.

In contrast to the screw threads, the sleeve threads in the transfer section are not interrupted. Rather, they wind continuously and constantly from the inlet region of the transfer section to its outlet region respectively in a substantially increasing and decreasing spiral manner around the longitudinal axis of the extruder.

In the first third of the transfer section, the screw core diameter increases from the maximum thread depth to the external diameter, i.e. the thread volume of the screw 6 decreases from the maximum value in the inlet region to zero. The thread volumes of the sleeve 20 have the reverse tendency. In consequence, the throughput volume which is effective for the extruded material is kept constant in the axial and radial directions of conveyance. Because of these circumstances, there is, of necessity, a one hundred percent exchange of extruded material between screw 6 and barrel sleeve 20.

When the outlet region of the transfer section shown in FIG. 2 has a length of approx. 1.4 D, the thread volume of the screw 6 continuously increases and that of the sleeve 20 continuously decreases, whereby, in turn, the total thread volume of screw and sleeve for the extruded material is kept constant.

In this embodiment also, the number of threads in the inlet region and in the outlet region of the transfer section 8 is constant, whereby the number of screw and housing sleeve flights depends on the cross-sectional area of the screw and housing threads.

Extensive experiments with the embodiments of the invention produced the result that, especially when processing highly viscous natural rubber mixtures, the pre-plasticizing in the pin section of the extruder with low shearing gradients prior to the intensive plasticizing work in the transfer section have both a discharge increasing effect and a positive effect on the pulsation behaviour of the machine.

In addition to the screw r.p.m. and the processing section temperatures, the machine has a further processing parameter which is freely preselectable and expands the versatility of the machine with regard to its ability to process a large strip width of various rubber mixtures.

In this embodiment, there is situated at the end of the first third of the transfer section 8 a throttle means which has pins 17, which are distributed equiangularly over the periphery of the transfer section and protrude radially into the uninterrupted threads of the transfer section sleeve 20, said pins being able to reduce the thread volume of the sleeve 20 in this section from the maximum value to zero.

With these throttle pins 17, which are either manually mechanically, pneumatically or hydraulically adjusted externally, the plasticizing work, or the friction energy converted in the transfer section, may be prescribed as desired for the extruded material.

These throttle pins 17 serve to permit the pin transfer extruder to process for the first time rubber mixtures having qualities which hitherto were not processable with sufficient homogeneity using cold-feed extrusion, even by using specifically optimized pin-barrel extruders. These are natural rubber qualities, for example, for the production of tank chain supports and tread strip mixtures with the same basic polymer for truck tires and large earth moving vehicle tires.

If the test results obtained hitherto with an extruder of the GE 150 STx9D type of the present invention are collated, it can be ascertained that, compared with the pin-barrel extruder, increases in the discharge rate of 25% to 50% can be achieved with low-viscosity synthetic rubber mixtures up to viscosities of 55 to 60 ML 1+4 (100° C.), with a reduction in the specific energy up to 20%.

With high-viscosity, difficult-to-process natural rubber qualities between 90 to 120 ML 1+4 (100° C.), the advantages are even more relevant since, as was shown, the homogeneity limit of the extruded material with a pin-barrel extruder is already reached with a discharge of approx. 800–1000 kg/h and, in consequence, double rates with the pin transfer extruder appear possible in individual cases.

FIGS. 3 a–c are graphs of test results which were achieved with an extruder of prior art (dotted curves) and a laboratory transfer pin extruder (solid curves), of the present invention, of a comparable size. A natural rubber mixture NK 90–95 ML 1+4 (100° C.) was used as the extruded material, which is known to be highly viscous and particularly difficult to process. In all three graphs, the speed of 25 revolutions per minute is marked by a vertical line with hatching alongside, up to which speed conventional extruders could process such a rubber mixture and produce a reasonable quality.

In FIG. 3a, the discharge of rubber is plotted in dependence upon the screw r.p.m., while FIG. 3b represents the mass temperature and FIG. 3c represents the specific energy requirement per kg extruded material, each being a function of the screw r.p.m. The combination of these three graphs shows that, with the concept of an extruder as proposed here, a high discharge of extruded material becomes possible with an excellent mixing and homogenising effect at a reasonable temperature for the extruded material and with a considerably reduced consumption of energy.

In addition, problems regarding product porosity in the profile, which already arose in the lower performance range in the pin-barrel extruder, could not be found at all in the pin transfer extruder.

FIG. 4 shows one embodiment of the extruder screw 6 in the transfer section 8. The respective increase and decrease in the cross-sectional area of the screw threads in the inlet and outlet regions, which are basically well-known, are only effected here by the conical change in the core cross-section, that is to say the thread depth, of the screw. It is true that the number of threads in the inlet and outlet regions differs from one another, but it is constant in each respective region. This results in the number of flights being dependent on the cross-sectional area 22 of the threads.

In a further embodiment, it is also apparent from FIG. 4 that the transfer screw in the region of maximum transfer of the extruded material to the housing threads, that is to say substantially in the region of the throttle pins 17, has grooves 23 in the screw core. It is true that these grooves 23 interconnect the screw threads in the inlet and outlet regions, but they do not permit any material to be conveyed therethrough because of their small depth of substantially 1 mm and their small width of substantially 10 mm. Rather, the mixing efficiency of the transfer section may be improved by their help, even with difficult extruded materials. This is substantially effected, in that additional shearing edges are made available by these grooves.

Figure 5:
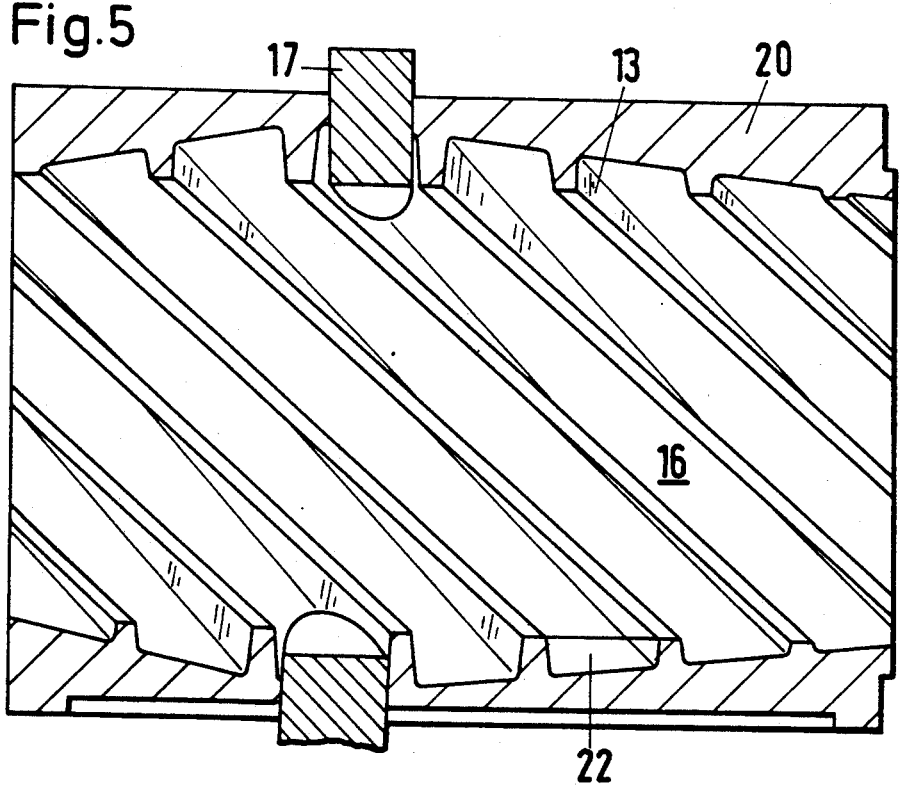
FIG. 5 is a schematic side elevational view of a transfer sleeve section which has been cut open.
Figure 6:
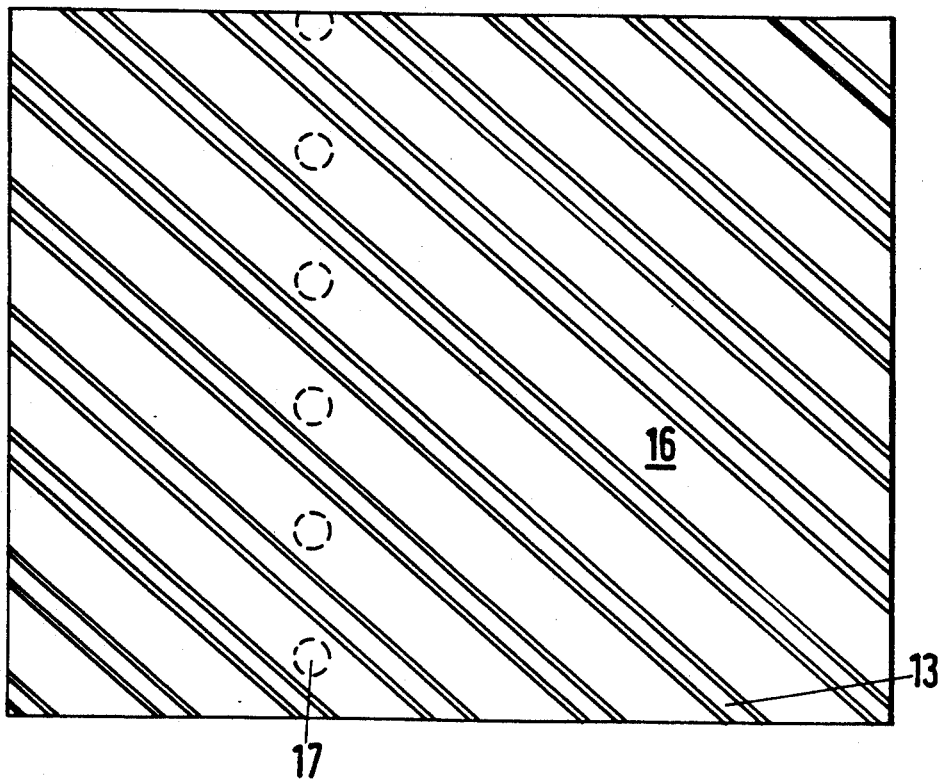
FIG. 6 illustrates a modification of the sleeve section shown in FIG. 5.

FIG. 5 is a schematic longitudinal sectional view through a transfer housing sleeve 20, which cooperates with the transfer screw shown in FIG. 4. It also becomes evident here that the number of housing threads is constant in each of the inlet and outlet regions, with the result that the number of housing flights remains independent of the cross-section of the housing threads.

This type of construction ensures, on the one hand, an excellent mixing quality with a very good self-cleaning effect, while it becomes clear, especially in conjunction with the modification of the sleeve component shown in FIG. 4 and FIG. 5, that the manufacturing outlay with housing (and screw) threads of identical widths is considerably reduced.

In conclusion, it should be pointed out that the proposed pin-barrel extruder may be used with or without throttle pins in the transfer section, although throttle pins should not be eliminated in the optimum structural form. Finally, the positioning of such pins permits the extruder to be set to the most varied rubber mixtures and to their processing parameters and, in consequence, it can be used by the operator universally. In a less preferred embodiment, the adjustable throttle pins may also be disposed at the downstream end of the extruder, substantially at the end of the pressure augmenting section 10.

I claim:

1. An extruder for processing thermoplastic material, comprising:
    an elongated extruder housing defining a feed section in which a feed inlet is provided for feeding material to the extruder, and an outlet section having a material outlet opening for discharging molten material under pressure from the extruder,
    an extruder screw having a screw core and a helical flight, said screw being mounted for rotation in said housing about the longitudinal axis of said screw, said housing and said screw core defining therebetween a processing chamber, and means for driving said screw,
    said housing further defining a pin-barrel section in which at least one row of pins extends radially inwardly toward the housing through the processing chamber toward the core of said screw, said helical flight of said screw being interrupted in the regions of said pins so as to accommodate rotation of said screw in such region,
    a transfer mix section defined by said housing longitudinally adjacent to said pin-barrel section, the helical flight of said screw in said transfer mix section being constructed so that thread depth of the areas between adjacent flight sections first decreases toward zero and then increases from a feed side of the transfer mix section to an outlet side to a maximum value, and wherein said housing in said transfer mix section is also formed with a helical flight generally aligned with the helical flight of said screw, said helical flight of said housing defining between adjacent flight sections thereof grooves which vary in depth and which are radially aligned with the areas between adjacent flight sections of said screw, the depth of said grooves between adjacent flight sections of said housing first increasing to a maximum thread volume and then decreasing from the feed side of the transfer mix section to the outlet side, and being generally inversely proportional to the thread depth between radially adjacent flight sections of said screw,
    a plurality of radially adjustable throttle pins protrudable into the housing and into the housing threads and processing chamber, and means for radially adjusting the depth of protrusion of said throttle pins, and
    wherein said transfer mix section is formed with inlet and outlet regions to either side of said region of maximum thread volume, the number of threads, and consequently the number of screw flights, in said inlet and outlet regions of said transfer mix sections being constant independently of the cross-sectional area of said housing threads and screw threads.

2. An extruder according to claim 1, wherein said pin-barrel section is disposed upstream of the transfer mix section.

3. An extruder according to claim 1, wherein said feed section is upstream of said pin-barrel section and said transfer mix section, and wherein material is extruded from said outlet section at a desired tool pressure.

4. An extruder according to claim 1, wherein the length of said extruder is approximately 10 screw diameters (D), the length of said feed section is 3 D, the length of said pin-barrel section is 1.5–2.0 D, the length of said transfer mix section is 2 to 2.5 D, and the length of the outlet section where pressure is increased is substantially 3 D.

5. An extruder according to claim 1, wherein one to five rows of pins are disposed in said pin-barrel section, said pins protruding radially into the processing chamber of the extruder housing, the screw flights of said screw being interrupted at the locations of said pins.

6. An extruder according to claim 1, wherein in said transfer mix section, angles between the flights of the extruder screw and the flights of the extruder housing are greater than or equal to 105°.

7. An extruder according to claim 1, wherein said throttle pins are disposed in the region of maximum thread volume of the housing threads.

8. An extruder according to claim 1, wherein said radially adjustable throttle pins are disposed downstream of said transfer mix section near said outlet section.

9. An extruder according to claim 1, wherein said throttle pins are radially adjustable by mechanically, pneumatically or hydraulically actuatable adjusting means.

10. An extruder according to claim 1, wherein said extruder screw in the transfer mix section is provided with flat and narrow grooves which interconnect the screw threads to either side of the region of said screw where the thread depth decreases toward zero.

* * * * *